Nov. 24, 1931.  A. J. BRADFORD  1,833,733
SOUND PICTURE PRODUCING APPARATUS
Filed Nov. 22, 1929
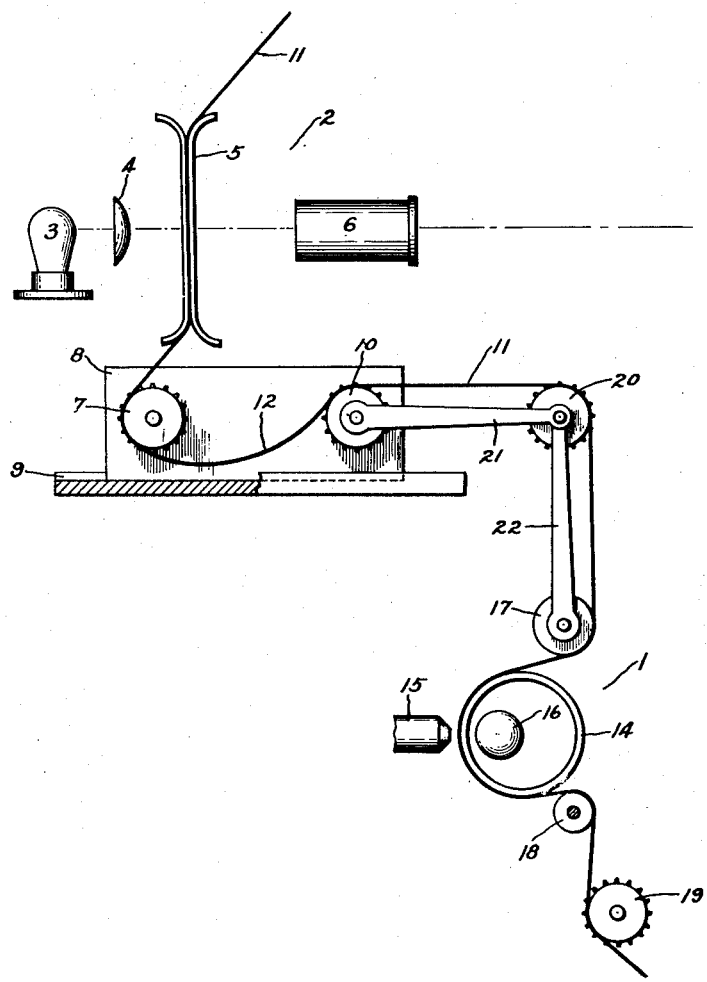
Inventor
Arthur J. Bradford,
by Chas. E. Mullan
His Attorney.

Patented Nov. 24, 1931

1,833,733

UNITED STATES PATENT OFFICE

ARTHUR J. BRADFORD, OF ALPLAUS, NEW YORK, ASSIGNOR TO GENERAL ELECTRIC COMPANY, A CORPORATION OF NEW YORK

SOUND-PICTURE PRODUCING APPARATUS

Application filed November 22, 1929. Serial No. 409,107.

My invention relates to apparatus for producing sound-pictures from a film containing the sound and picture records. Certain forms of apparatus of this character comprise a motion picture projector having a framing device which includes a constant speed film engaging sprocket arranged to have a limited movement bodily together with the intermittent incident to the framing operation, the film passing in a loop therebetween. From this sprocket of the picture projector the film bearing the sound and picture records passes to one or more rollers and sprocket of the sound reproducer. Inasmuch as the corresponding points of the two records are spaced from each other a definite distance along the film it is necessary for proper synchronism in the reproduction of the records to place the film in the reproducing apparatus so that the same distance measured along the film shall obtain between the points of picture and sound reproduction. To bring about this condition the film would pass in a free loop between the projector and the sound reproducer, the size of the loop depending upon the judgment of the operator. It may happen that as a result of hastily threading up the apparatus with a new film the loop is left too large or too small for proper synchronization. The loop moreover may be left so small that in the subsequent framing operation the loop is reduced to zero and the film is drawn so tightly that it becomes damaged such as being broken out at the sprocket holes or being torn in two. On the other hand the loop may be left so large that after the picture is framed the loop has increased in size to such an extent that it interferes with other parts of the apparatus. It is an object of my invention to provide an improved apparatus of this character which shall avoid the above noted objections and difficulties and which shall be simple in construction, efficient in operation and economical to maufacture.

In the single figure of the drawing I have shown the sound reproducer 1 and the picture projector 2 in a diagrammatic manner only. The more essential elements of the latter comprise the light source 3, the condensing lens 4, the picture gate 5, the objective lens 6 and the intermittently operated sprocket 7. For framing the picture the intermittent sprocket 7 is shown mounted upon the slide 8 which is arranged to slide horizontally in guides 9. Mounted also upon the slide 8 is the constant speed drive sprocket 10 between which and the intermittent sprocket the film 11 bearing the picture and sound records extends in a small loop 12 as is customary at the departing side of the sprocket. The more essential elements of the sound reproducer as shown comprise the gate 14 shown as a rotatable drum which supports the film in proper relation to the optical system 15 and which encloses the photoelectric cell 16. Upon approaching the drum 14 the film passes over the roller 17 which, although rotatable, for convenience will be termed a fixed roller since its axis is fixed. Upon leaving the drum 14 the film passes over the fixed roll 18 and thence to the drive sprocket 19 whose axis also is fixed.

In order that the operator in threading a film in the apparatus shall leave a loop of the correct size between the sprocket 10 of the picture projector and the roller 17 of the sound reproducer to produce proper synchronism, I have provided the roller 20 which is movably supported, and hence for convenience will be termed a movable roller, at the common pivotal point of the links 21 and 22, of which link 21 is pivoted at its opposite end concentrically with the sprocket 10 and link 22 is pivoted at its opposite end concentrically with the roller 17. The two rollers 17 and 20 are of substantially the same diameter and the two links preferably make approximately a right angle with each other. The roller 20 may be a free running roller but when I use a sound gate of the construction illustrated wherein it is driven by the film passing thereover I have found it preferable to restrain the rotation of this roller by friction or other suitable means thus producing a slight tension in the film whereby better adhesion is had with the drum. To avoid sliding of the film on the restrained roller 20 I prefer to use a roller having sprocket teeth, for example, an ordinary sprocket. Without the roller 20, there would be nothing to determine the size of the loop which the operator should leave between the sprocket 10 of the projector and the roller 17 of the sound reproducer for proper synchronization, nor would he be sure that he had left a loop of such a size that movement of the slide 8 to the left, as seen in Fig. 1, for framing purposes would not draw the film tightly between the sprocket 10 and roller 17, perhaps damaging it, or that movement of the slide to the right would not allow the film in the loop to become entangled or to interfere with other apparatus.

When the operator threads a film through the apparatus which I have shown and described, the position of the roller 20 naturally determines the correct length of the loop between the picture projector and the sound reproducer for proper synchronization. By reason of the mounting of roller 20 on the links 21 and 22 the length of the loop remains fixed during all necessary movement of the slide 8 to effect the framing of the picture.

What I claim as new and desire to secure by Letters Patent of the United States, is,—

1. In combination a motion picture projector having a framing device including a bodily movable sprocket, a sound reproducer including a fixed roller, and a movable roller arranged to engage a film passing from said sprocket to said fixed roller, and means for maintaining the movable roller at a fixed distance from the sprocket and the fixed roller thereby to insure a predetermined and fixed length of film between said sprocket and said fixed roller independent of movement of the movable sprocket due to framing 2. In combination a motion picture projector having a framing device including a bodily movable sprocket, a sound reproducer including a fixed roller, a movable roller adapted to engage a film passing from said sprocket to said fixed roller, and mounting means for said movable roller including a connection for preserving a fixed spacing thereof from said sprocket, whereby the length of film between said sprocket and fixed roller is predetermined and is unaffected by the movement of said sprocket.

3. In combination a motion picture projector having a framing device including a bodily movable sprocket, a sound reproducer including a fixed roller, a movable roller adapted to engage a film passing from said sprocket to said fixed roller and mounting means for said movable roller including a plurality of links connecting the center thereof with the center of said sprocket and with the center of said fixed roller.

4. In combination a motion picture projector having a framing device including a sprocket having a limited linear movement, a sound reproducer including a fixed sprocket and a fixed roller, a movable roller adapted to engage a loop in a film passing from said first mentioned sprocket to said fixed roller, and mounting means for said movable roller including a link connecting its center with the center of the first mentioned sprocket and a second link arranged approximately at right angles to said first link and connecting the center of the movable roller with the center of the fixed roller.

In witness whereof, I have hereunto set my hand this 21st day of November, 1929.

ARTHUR J. BRADFORD.